Nov. 26, 1968  B. C. BENJAMIN  3,412,969
VALVE WITH DASHPOT ASSEMBLY
Filed Feb. 9, 1966  3 Sheets-Sheet 1

INVENTOR.
BENJAMIN C. BENJAMIN
BY
Barnes, Kisselle Raisch Choate
ATTORNEYS

INVENTOR.
BENJAMIN C. BENJAMIN
BY
Barnes, Kisselle, Raisch & Choate
ATTORNEYS

Nov. 26, 1968  B. C. BENJAMIN  3,412,969
VALVE WITH DASHPOT ASSEMBLY

Filed Feb. 9, 1966

INVENTOR.
BENJAMIN C. BENJAMIN
BY
ATTORNEYS

United States Patent Office 3,412,969
Patented Nov. 26, 1968

3,412,969
VALVE WITH DASHPOT ASSEMBLY
Benjamin C. Benjamin, Flint, Mich., assignor to Fuller & Emerson Manufacturing Company, Detroit, Mich., a corporation of Michigan
Filed Feb. 9, 1966, Ser. No. 526,309
15 Claims. (Cl. 251—23)

ABSTRACT OF THE DISCLOSURE

The valve assembly disclosed herein comprises a housing having an inlet and an outlet and a valve seat at the inlet. A dashpot assembly comprising a casing having a valve seat seal thereon is supported adjacent the inlet for movement toward and away from the valve seat. A spring yieldingly urges the casing toward the valve seat. The dashpot assembly includes a plunger extending through the casing and a diaphragm dividing the dashpot casing into two chambers. A metering opening is provided between the two chambers.

---

This invention relates to a valve assembly and particularly to a valve assembly for controlling the passage of a gaseous fluid such as air for a predetermined interval of time.

In the control of automobile engines, it has heretofore been suggested that in order to control the emission of unburned hydrocarbons, it would be desirable to apply air continuously from an air pump to the exhaust manifold of the engine and to provide air from the air pump to the inlet manifold for a predetermined interval of time when the throttle lever is released to close the throttle.

It is therefore an object of this invention to provide a valve assembly which will continuously supply air to an exhaust manifold and will supply air to the inlet manifold for a predetermined interval of time when the throttle lever is released; which will remain open to supply air to the inlet manifold for a time depending upon the rate at which the throttle is closed, that is, the faster the throttle closing, the longer the time delay, and the slower the throttle closing, the shorter the time delay; which is relatively low in cost; and which effectively provides protection from dirt and the like.

Figure 1:
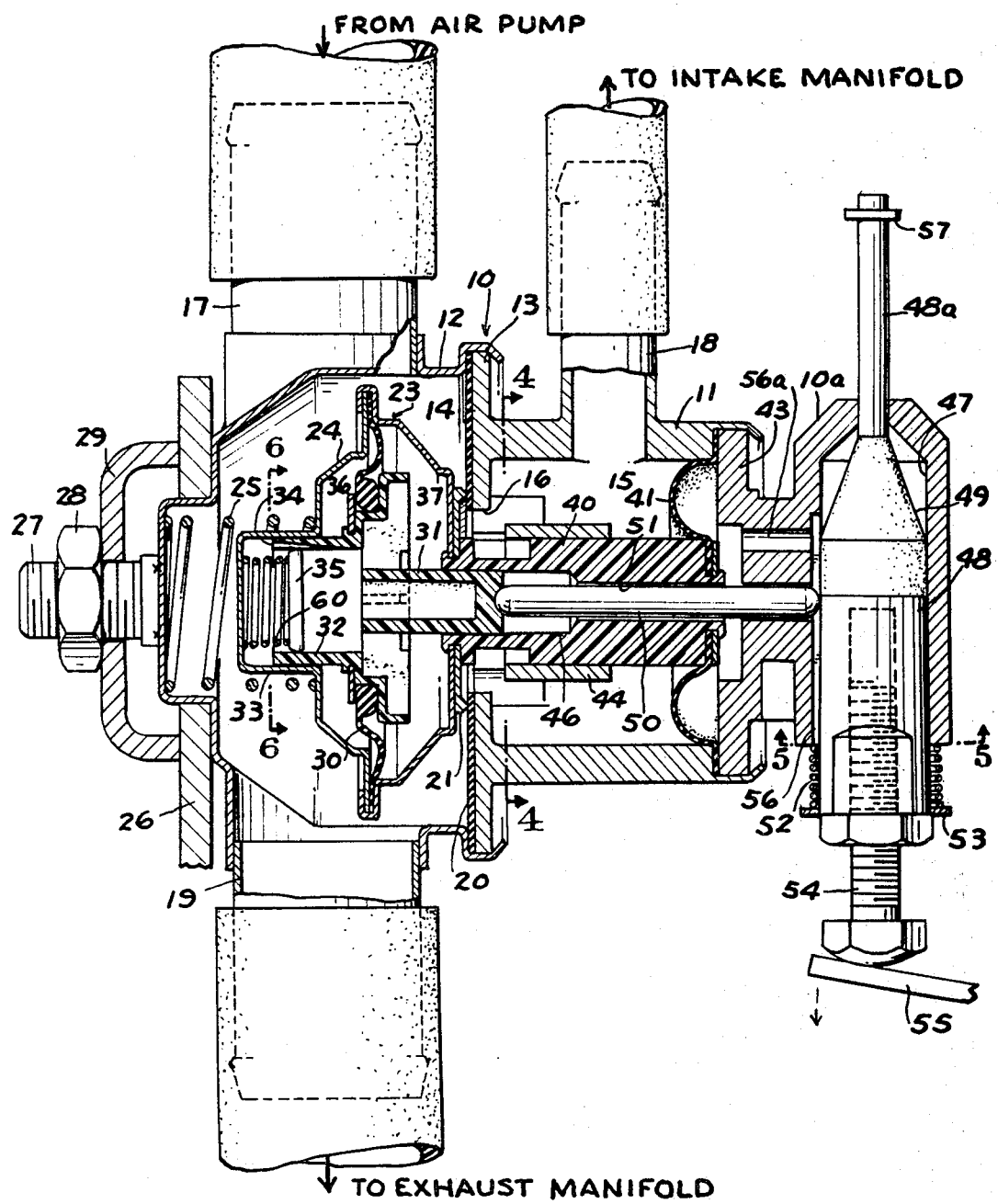
FIG. 1 is a part sectional view through a valve assembly embodying the invention showing the connections to an automobile engine in diagrammatic fashion.

Referring to FIG. 1, the valve assembly comprises a housing 10 including a body 11 and a cover 12 crimped over a flange 13 on the body 11. The housing 10 is divided into two chambers 14, 15 and communication is selectively provided between the chambers through a passage 16.

The valve assembly is particularly adapted for use in connection with an automobile engine for controlling the flow of air from an air pump to an intake manifold. Accordingly, the cover portion 12 of the housing 10 includes an inlet 17 that is adapted to be connected to the air pump and the body 11 includes an outlet 18 that is adapted to be connected to the intake manifold. An outlet 19 is provided on the cover portion 12 for supplying air continuously to the exhaust manifold of the automobile engine. If the engine has two intake manifolds, then a pair of outlets 18 can be provided.

A valve seat is formed by a gasket 20 around the inlet passage 16 and a valve seat seal 21 having an annular rib 22 is adapted to be moved into sealing engagement with the valve seat 20 to cut off communication between the chambers 14, 15 through passage 16.

A dashpot assembly 23 is positioned within the chamber 14 in cover portion 12 of the housing 10 and comprises a sectional dashpot casing 24 on which the valve seat 21 is mounted. A spring 25 is interposed between the cover portion 12 and the casing 24 and yieldingly urges the dashpot casing 24 and, in turn, the valve seat seal 21 against the valve seat 20. The entire housing 10 is supported on a bracket 26 by a screw 27 and nut 28 that urge a clamp 29 against the bracket 26.

Figure 6:
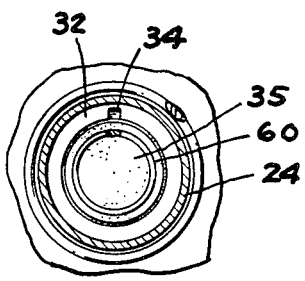
FIG. 6 is a fragmentary sectional view taken along the line 6—6 in FIG. 1.
Figure 7:
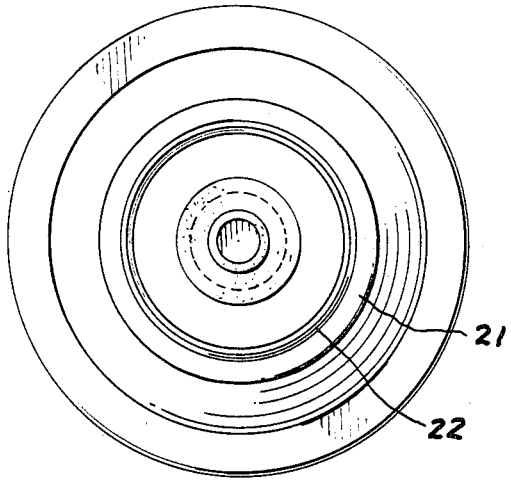
FIG. 7 is an end view of the dashpot assembly forming a part of the valve assembly taken from the right as viewed in FIGS. 1–3.

The dashpot assembly 23 is substantially the same as disclosed and claimed in the patent to Emerson et al. 2,894,740, issued July 14, 1959, and comprises a diaphragm 30 interposed between the flanges of the two halves of the dashpot casing and a plunger 31 that extends through the casing to the exterior. The plunger 31 includes a sleeve 32 that is guided within a portion 33 of the dashpot casing. A tapered metering groove 34 is provided on the interior of the sleeve 32 and a plug 35 is press fitted in the sleeve, the degree of penetration of the plug determining the size of the resultant metering opening that is formed (FIG. 6). The metering groove 34 restricts the flow of fluid from the chamber 36 to the chamber 37 when the plunger is moved to the left, as presently described. The inner edge of the diaphragm 30 is adapted to seal on the plunger when the plunger is moved to the left but to permit flow of air between the chambers when the plunger is moved to the right.

As further shown in FIG. 1, an extension 40 extends axially from the casing 24 through the inlet passage 16. A second diaphragm 41 is clamped between a washer 42 on the end of the extension 40 at its inner periphery and between an end plug 43 of the housing and the main body of the housing at its outer periphery. A bearing sleeve 44 is supported within the chamber 15 by radial webs 45 and serves as a bearing for the extension 40. The plunger 31 extends into a cylindrical opening 46 in the extension 40 so that the cylindrical opening 46 serves as a bearing for guiding the plunger 31.

Figure 2:
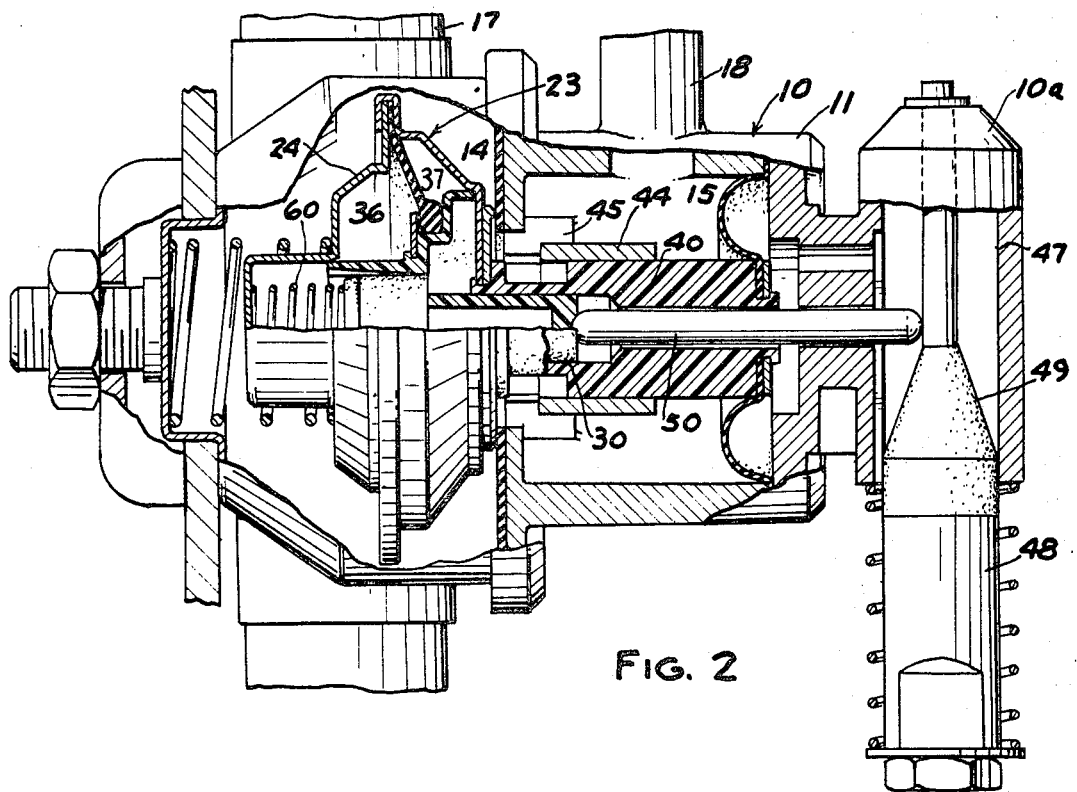
FIG. 2 is a view similar to FIG. 1 showing the relative positions of the parts when the throttle is closed.

The end wall 43 of the housing includes a tubular extension 10a which has a cyindrical passageway 47 at a right angle to the axis of movement of the plunger 31. An actuating member 48 which is generally cylindrical is mounted for reciprocating movement in the opening 47. The actuating member 48 is preferably made of a low friction material such as nylon or Teflon and has an inclined cam surface 49. A pin 50 is slidably received in an opening 51 in the extension 40. One end of the pin 50 engages the end of the plunger 31 while the other end of the pin 50 engages the peripheral surface of the actuating member 48. The actuating member 48 is yieldingly urged outwardly relative to housing 10 by a coil spring 52 that is compressed between the end of the extension 10a and a washer 53 on the actuating member 48 which is held on the actuating member by a nut 53a threaded on a screw 54 in the end of the actuating member. Screw 54 is adapted to be engaged by a lever 55 which, for example, may be a spring loaded lever operated in connection with the throttle of the automobile engine. A slot 56 and passage 56a provide a vent for air so that air will not be entrapped in the tubular extension 47. Actuating member 48 has a reduced end 48a that projects outwardly through an opening in the extension 10a. A washer 57 on the reduced end 48a of the actuating member 48 serves as a stop to limit the outward movement of the actuating member 48 relative to the housing as shown in FIG. 2.

When the throttle of the automobile engine is closed, that is, when the accelerator pedal is not depressed, the lever 55 operates upon the actuating member 48 and the parts are in the relative position shown in FIG. 1. When the accelerator is depressed and the throttle is opened, the movement of the lever 55 away from the screw 54 permits the spring 52 to move the actuating member 48 outwardly of the housing 10 so that the pin 50 moves relative to the actuating member 48 along the inclined surface 49 to the reduced portion 48a. This permits the plunger 31 to assume the position shown in FIG. 2. In this position, the plunger 31 has moved to the right under the action of the light spring 60 interposed between the plug 35 and the dashpot 24.

Figure 3:
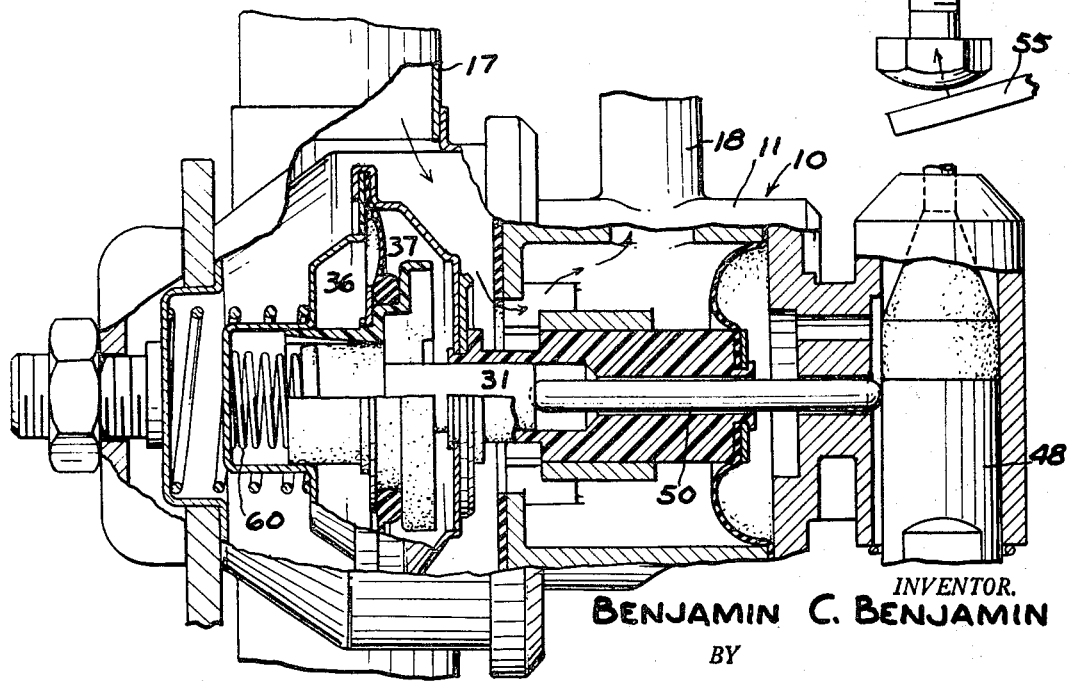
FIG. 3 is a view similar to FIGS. 1 and 2 showing the relative positions of the parts at the instant when the throttle lever has been released and has moved to a closed position.
Figure 4:
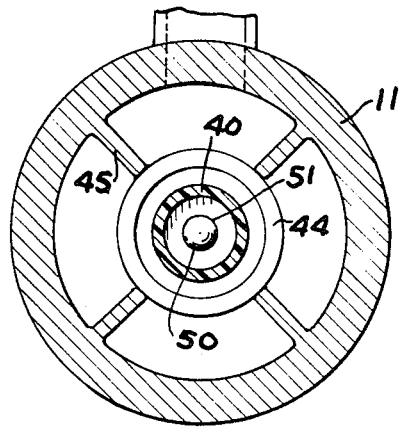
FIG. 4 is a fragmentary sectional view on an enlarged scale taken along the line 4—4 in FIG. 1.
Figure 5:
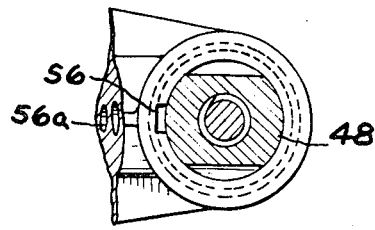
FIG. 5 is a fragmentary sectional view taken along the line 5—5 in FIG. 1.

When the accelerator pedal is released causing the throttle to close, the lever 55 forces the actuating member 48 inwardly to move the pin 50 to the left as shown in FIG. 3. This forces the plunger 31 to the left. However, since the flow of air between the chambers 36, 37 is restricted by the metered opening 35, the plunger cannot move relative to the dashpot casing so that the dashpot casing is moved bodily to the left carrying the valve seat seal 21 away from the valve seat 20. This permits air to flow from the inlet 17 through passage 16 to the chamber 15 and, in turn, out through the outlet 18. If the force on the actuating member 48 continues, that is, if the accelerator pedal and, in turn, the lever 55 are not actuated, then the spring 25 will apply a continuing force on the dashpot casing 24 forcing the air out of the chamber 36 through the metered opening 34 into the chamber 37 so that the dashpot casing 24 will move to the right and carry the valve seat seal 21 into sealing engagement with the valve seat 20.

It can be seen that the metered opening 34 controls the time delay and thereby the interval during which air flows from the chamber 14 to the chamber 15. This may be on the order of three to four seconds.

The extent of the time delay depends also upon the rapidity of the force with which the plunger 31 is moved to the left. Thus, if the actuating member 48 is moved inwardly slowly as when the accelerator pedal is released slowly, the plunger 31 will be moved to the left slowly and a lesser portion of air will be entrapped in the chamber 36 so that the time delay will be shorter. If, on the other hand, the actuating member 48 is moved rapidly inwardly as when the accelerator pedal is suddenly released, the plunger 31 will be moved to the left rapidly entrapping a larger quantity of air in the chamber 36 and producing a longer time delay.

The compensating diaphragm 41 provides the necessary area compensation with the seal 21 so that the force required to move the actuating member 48 inwardly is as small as possible. In addition, diaphragm 41 provides for dirt protection and permits more easy alignment of the parts.

I claim:
1. In a valve assembly, the combination comprising
a housing having an inlet and an outlet,
a valve seat at the inlet,
a valve seat seal operatively connected with the inlet and adapted to engage the valve seat,
a dashpot assembly,
said dashpot assembly comprising a casing,
said valve seat seal being mounted on said casing,
means for supporting said casing adjacent said inlet for movement toward and away from said valve seat,
means yieldingly urging said casing toward said valve seat,
said dashpot assembly including a plunger extending through said casing,
piston means within said casing dividing said dashpot casing into two chambers,
and a continuously open metering opening between said chambers,
whereby when said plunger is moved in a direction tending to move said valve seat seal away from said valve seat, said metered opening resists the flow of fluid between one chamber and another thereby causing the movement of said plunger to move the dashpot casing bodily away from said valve seat seal and carry said valve seat seal away from said valve seat and the subsequent passage of fluid between said one chamber and said other chamber through said metering opening under the action of said yielding means gradually permits the return of said dashpot casing and said valve seat seal into fluid sealing relation with said valve seat so that passage of fluid from said inlet through said outlet is interrupted.

2. The combination set forth in claim 1 including an actuating member mounted for reciprocating movement on said body,
said actuating member being operatively connected with said plunger.

3. The combination set forth in claim 1 including an actuating member mounted for reciprocating movement on said body along an axis forming an angle with the axis of said plunger,
said actuating member having a cam surface thereon,
and a pin axially aligned with said plunger and mounted for reciprocation within said body at an angle to the line of reciprocation of said actuating member for providing a force on said plunger when said pin engages said cam surface to move said plunger in a direction away from said valve seat.

4. The combination set forth in claim 1 including a secondary seal associated with and movable with said casing within said body.

5. The combination set forth in claim 1 including a cover surrounding said dashpot assembly and having an inlet therein,
said yielding means comprising a spring between said cover and said dashpot assembly yieldingly urging said dashpot assembly in a direction to move said valve seat seal into engagement with said valve seat.

6. In a valve assembly, the combination comprising
a valve housing including a first chamber and a second chamber with a passage providing communication between said first and second chamber,
said housing having an opening providing an inlet to said first chamber and an opening providing an outlet from said second chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger extending from the interior of said dashpot casing through said passage,
piston means supporting said plunger and dividing said dashpot casing into a pair of dashpot chambers,
means forming a continuously open metering opening between said dashpot chambers of said dashpot,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing.

7. The combination set forth in claim 6 including an actuating member,
said body having a transverse opening therein forming a guide for reciprocating movement of said actuating member,
means yieldingly urging said actuating member outwardly of said body,
said actuating member having an inclined cam surface,
and a pin mounted for reciprocating movement in said housing and having one end thereof engaging said actuating member whereby when said actuating member is moved inwardly of the housing to cause the cam surface thereof to engage the other end of said pin, said pin moves said plunger in a direction tending to move the valve seat seal away from the valve seat.

8. In a valve assembly, the combination comprising a valve housing including a first chamber and a second chamber with a passage providing communication between said first and second chamber,
said housing having an opening providing an inlet to said first chamber and an opening providing an outlet from said second chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger extending from the interior of said dashpot casing through said passage,
a diaphragm supporting said plunger and dividing said dashpot casing into a pair of dashpot chambers,
means forming a metering opening between said dashpot chambers of said dashpot,
an extension on said dashpot casing extending through said inlet passage,
and a diaphragm associated with said extension and said second chamber providing a seal,
said valve housing having a bearing for guiding said extension,
said plunger extending into said extension so that said extension acts as a bearing for said plunger,
an actuating member,
said body having a transverse opening therein forming a guide for reciprocating movement of said actuating member,
means yieldingly urging said actuating member outwardly of said body,
said actuating member having an inclined cam surface,
and a pin mounted for reciprocating movement in said housing and having one end thereof engaging said actuating member whereby when said actuating member is moved inwardly of the housing to cause the cam surface thereof to engage the other end of said pin, said pin moves said plunger in a direction tending to move the valve seat seal away from the valve seat,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing.

9. In a valve assembly, the combination comprising a valve housing including a first chamber and a second chamber with a passage providing communication between said first and second chamber,
said housing having an opening providing an inlet to said first chamber, an outlet from said first chamber and at least one outlet from said second chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger of low friction material extending from the interior of said dashpot casing through said passage,
a diaphragm supporting said plunger and dividing said dashpot casing into a pair of dashpot chambers,
means forming a metering opening between said dashpot chambers of said dashpot,
an actuating member of low friction material,
said body having a transverse opening therein forming a guide for reciprocating movement of said actuating member,
means yieldingly urging said actuating member outwardly of said body,
said actuating member having an inclined cam surface,
and a pin mounted for reciprocating movement in said housing and having one end thereof engaging said actuating member whereby when said actuating member is moved inwardly of the housing to cause the cam surface thereof to engage the other end of said pin, said pin moves said plunger in a direction tending to move the valve seat seal away from the valve seat,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing.

10. The combination set forth in claim 9 including an extension of low friction material on said dashpot casing extending through said inlet passage,
and a diaphragm associated with said extension and said second chamber providing a seal,
said housing having a bearing for guiding said extension,
said plunger extending into said extension so that said extension acts as a bearing for said plunger.

11. In a valve assembly, the combination comprising
a housing having an inlet and an outlet,
a valve seat at the inlet,
a valve seat seal operatively connected with the inlet and adapted to engage the valve seat,
a dashpot assembly,
said dashpot assembly comprising a casing,
said valve seat seal being mounted on said casing,
means for supporting said casing adjacent said inlet for movement toward and away from said valve seat,
means yieldingly urging said casing toward said valve seat,
said dashpot assembly including a plunger extending through said casing,
a diaphragm within said casing connected to the plunger and dividing said dashpot casing into two chambers,
and a metering opening between said chambers,
an actuating member mounted for reciprocating movement on said body,
said actuating member having a cam surface thereon,
and a pin axially aligned with said plunger and mounted for reciprocation within said body at an angle to the line of reciprocation of said actuating member for providing a force on said plunger when said pin engages said cam surface to move said plunger in a direction away from said valve seat,
a secondary seal associated with and movable with said casing within said body,
whereby when said plunger is moved in a direction tending to move said valve seat seal away from said valve seat, said metered opening resists the flow of fluid between one chamber and another thereby causing the movement of said plunger to move the dashpot casing bodily away from said valve seat seal and carry said valve seat seal away from said valve seat and the subsequent passage of fluid between said one chamber and said other chamber through said metering opening under the actuation of said sealing means gradually permits the return of said dashpot casing and said valve seat seal into fluid sealing relation with said valve seat so that passage of fluid from said inlet through said outlet is interrupted.

12. In a valve assembly, the combination comprising
a valve housing including a first chamber and a second chamber with a passage providing communication between said first and second chamber,
said housing having an opening providing an inlet to said first chamber and an opening providing an outlet from said chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger extending from the interior of said dashpot casing through said passage,
piston means supporting said plunger and dividing said dashpot casing into a pair of dashpot chambers,
means forming a metering opening between said dashpot chambers of said dashpot,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing,
said piston means in said dashpot including a diaphragm portion.

13. In a valve assembly, the combination comprising
a valve housing including a first chamber and a second chamber with a passage providing communication between said first and second chamber,
said housing having an opening providing an inlet to said first chamber and an opening providing an outlet from said second chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger extending from the interior of said dashpot casing through said passage,
piston means supporting said plunger and dividing said dashpot casing into a pair of dashpot chambers,
means forming a metering opening between said dashpot chambers of said dashpot,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing,
and bearing means in said passage for guiding said plunger.

14. In a valve assembly, the combination comprising
a valve housing including a first chamber and a second chamber with a passage providing communication between said first and second chamber,
said housing having an opening providing an inlet to said first chamber and an opening providing an outlet from said second chamber,
a valve seat associated with said passage defining communication between said first and second chambers,
a valve seat seal for engaging said valve seat,
a dashpot assembly mounted within said first chamber,
said dashpot assembly comprising a dashpot casing,
said valve seat seal being mounted on said dashpot casing,
spring means interposed between said valve housing and said dashpot casing yieldingly urging said dashpot casing in a direction to cause said valve seat seal to engage said valve seat,
a plunger extending from the interior of said dashpot casing through said passage,
piston means supporting said plunger and dividing said dashpot casing into a pair of dashpot chambers,
means forming a metering opening between said dashpot chambers of said dashpot,
whereby when a force is applied to said plunger in a direction tending to move said valve seat seal away from said valve seat, said metering opening retards flow of fluid between the dashpot chambers of the dashpot casing and causes the dashpot casing to be moved bodily against the action of said spring means thereby moving said valve seat seal away from said valve seat and subsequent flow of fluid through said metering opening permits said spring means to move said dashpot assembly and carry said valve seat seal into engagement with said valve seat thereby cutting off communication between said first and second chambers of said housing, and an extension on said dashpot casing extending through said passage, and a diaphragm associated with said extension and said second chamber providing a seal.

15. The combination set forth in claim 14 wherein said housing has a bearing for guiding said extension, said plunger extending into said extension so that said extension acts as a bearing for said plunger.

References Cited

UNITED STATES PATENTS 213,324 3/1879 Demarest _____ 251—15 X

FOREIGN PATENTS 325,319 2/1930 Great Britain.
372,064 5/1932 Great Britain.

ARNOLD ROSENTHAL, *Primary Examiner.*